United States Patent [19]  
Mandelko

[11] Patent Number: 4,804,030  
[45] Date of Patent: Feb. 14, 1989

[54] TIRE BEAD SEPARATOR  
[76] Inventor: Melvin A. Mandelko, P.O. Box 756, Fort Dodge, Iowa 50501  
[21] Appl. No.: 198,664  
[22] Filed: May 23, 1988

Related U.S. Application Data

[63] Continuation of Ser. No. 924,910, Oct. 30, 1986, abandoned.

[51] Int. Cl.$^4$ ............................................. B60L 25/06  
[52] U.S. Cl. .................................................. 157/1.17  
[58] Field of Search .................... 157/1.1, 1.17, 20, 14

[56]   References Cited  
U.S. PATENT DOCUMENTS

| | | | |
|---|---|---|---|
| 2,413,010 | 12/1946 | Teegarden | 157/1.17 |
| 3,142,330 | 7/1964 | Nelson . | |
| 3,612,140 | 10/1971 | Malinski | 157/1.17 |
| 3,722,570 | 3/1973 | McKenny | 157/1.17 X |
| 4,014,375 | 3/1977 | Malinski et al. | 157/1.17 |

Primary Examiner—Debra Meislin  
Attorney, Agent, or Firm—Emrich & Dithmar

[57]  ABSTRACT

Apparatus for separating the bead of a tire from the wheel upon which it is mounted includes first and second cylinders having their respective piston rods coupled to a movable shoe element for engaging and displacing the bead of the tire. Coordinated extension and retraction of the piston rods of the first and second cylinders under the control of a pneumatically actuated, hydraulic control system is accomplished by manual operation of a first hydraulic transfer valve and a second air charging valve. The apparatus includes a single, unitary support frame having an inclined, manually rotatable table upon which the tire and wheel combination is positioned for engagement by the shoe element in an arrangement which is compact, facilitates handling and positioning of the tire and wheel combination, and provides improved safety for the operator.

4 Claims, 3 Drawing Sheets

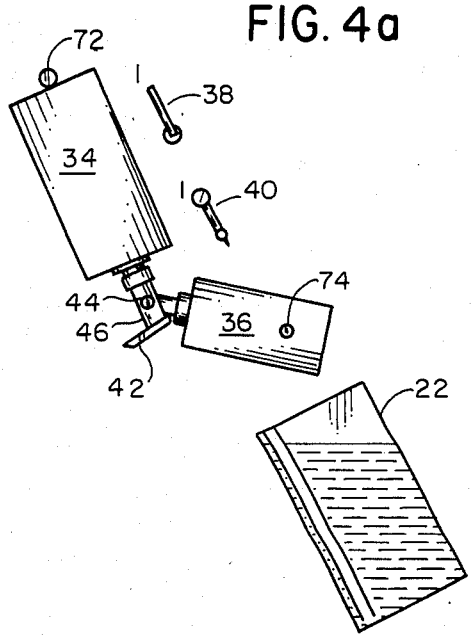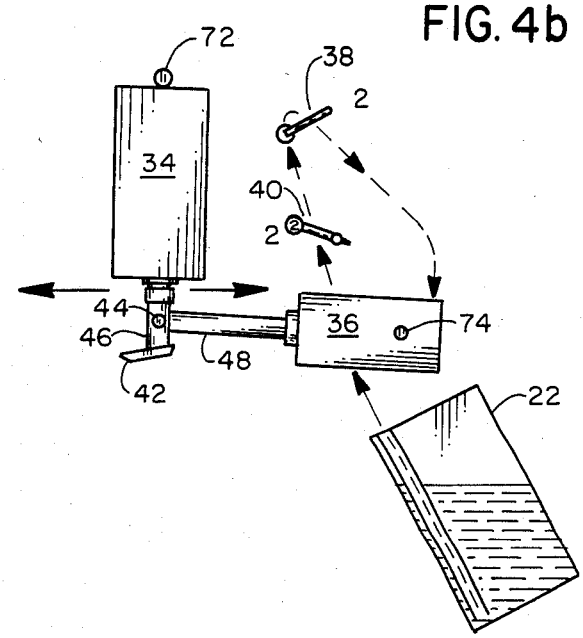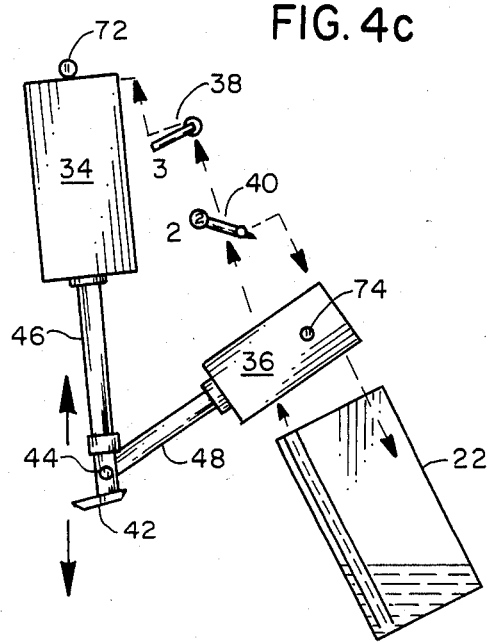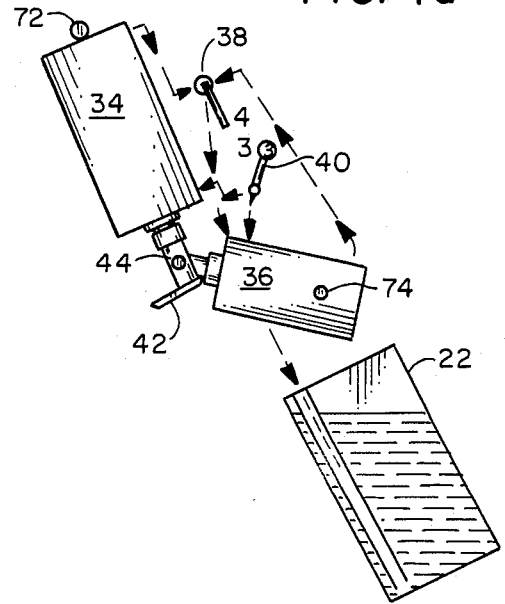

TIRE BEAD SEPARATOR

This is a continuation of application Ser. No. 924,910 filed Oct. 30, 1986 now abandoned.

BACKGROUND OF THE INVENTION

This invention relates generally to apparatus for removing a tire from a wheel and is particularly directed to an arrangement for separating the bead of a tire from the wheel upon which it is mounted.

A tire bead is the inner portion of the tire in the shape of a projecting rim or band which is adapted to engage a peripheral portion of a wheel. The tire is provided with a pair of facing, spaced beads for secure mounting of the tire on the wheel in a sealed manner. Over long periods of use, a very strong seal may form between the tire bead and the wheel, particularly where rust has accumulated along the bead/wheel interface. While this increased seal strength is desirable from a safety standpoint, particularly in the case of tubeless tires, it presents a problem when it becomes necessary to remove the tire from the wheel for repair or replacement.

Early attempts to "break" the tire bead, as the separation of the tire bead from the wheel is termed in the art, involved striking the lateral walls of the tire in order to break the bead/wheel bond and loosen the tire. This frequently resulted in damage to the peripheral portion of the wheel, or its rim, particularly in the case of wheels comprised of a metal alloy such as chrome magnesium which is particularly brittle and subject to damage upon impact.

Later developments in this area made use of apparatus specifically designed for breaking the tire bead and removing the tire from its wheel. Such apparatus generally makes use of a cylinder operated by a hydraulic, pneumatic, or combination hydraulic and pneumatic control system and includes a bead engaging element disposed on the distal end of the cylinder's piston rod. The tire and wheel combination is typically oriented either vertically or horizontally during the tire removal procedure. Where the tire is oriented vertically, the tire generally must be raised onto the apparatus with great difficulty, particularly in the case of large truck tires, and must also be lifted with even greater difficulty for rotating the tire in order to separate the bead at various locations around the inner rim of the tire. In order to facilitate rotation of the tire and wheel combination, the apparatus is frequently provided with a bearing structure upon which the tire is positioned to facilitate its manual rotation. The bearings increase the cost and complexity of the apparatus which includes structure for supporting the vertically oriented tire and wheel combination which also substantially increases the size and weight of the apparatus.

Horizontal orientation of the tire requires considerable force to rotationally displace the tire to free its bead around the entire circumference thereof and to turn the tire over for releasing its other bead. In order to avoid dealing directly with the large weights and associated large handling forces required with the horizontally oriented tire, some approaches have made use of a portable tire bead separator which is mounted to the wheel and moved around its circumference to separate the entire tire bead. However, such portable units themselves generally weigh on the order of 50 pounds and require considerable strength to manipulate and operate.

The present invention is intended to overcome the aforementioned limitations of the prior art by means of a compact and portable apparatus wherein the tire is positioned in an orientation which facilitates its positioning upon and removal from the apparatus as well as its rotational displacement in an arrangement which also affords increased operator safety and more precise control of the tire bead breaking element to allow for its entirely remote control.

OBJECTS OF THE INVENTION

Accordingly, it is an object of the present invention to simply and economically facilitate the release of a tire from the constraints of the wheel upon which it is mounted.

It is another object of the present invention to provide safer apparatus for separating and removing a tire from a wheel.

Yet another object of the present invention is to provide a pneumatically actuated, hydraulically controlled system for breaking a tire bead.

A further object of the present invention is to provide tire bead separating apparatus which facilitates handling and manipulation of a tire and wheel combination before, during and after separation of the tire from the wheel.

A still further object of the present invention is to prevent damage to the sidewall, lock ring, or rim edges of a wheel during removal of a tire therefrom.

This invention contemplates apparatus for separating the bead of a tire from the wheel upon which the tire is mounted. The apparatus includes a compact frame for pivotally supporting a first upper generally vertically oriented cylinder and a second lower, generally horizontally oriented cylinder. The distal ends of the piston rods of both cylinders are coupled to a shoe element which is adapted to engage and downwardly displace the bead of the tire in separating the bead from the lateral wall of the wheel upon which the tire is mounted. The two cylinders are pneumatically actuated and hydraulically controlled in response to user-initiated inputs to a first hydraulic transfer valve and a second pneumatic charging valve for precise positioning of the tire-engaging shoe element. The apparatus further includes an inclined rotatable table which facilitates secure positioning of the tire and wheel combination on the apparatus as well as its rotational displacement and the removal of the broken-away tire from the wheel.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 4a through 4d illustrate the sequence of operations in the tire bead separator of the present invention during separation of a tire bead from the wheel upon which the tire is mounted.

DETAILED DESCRIPTION OF THE PREFERRED EMBODIMENT

Figure 1:
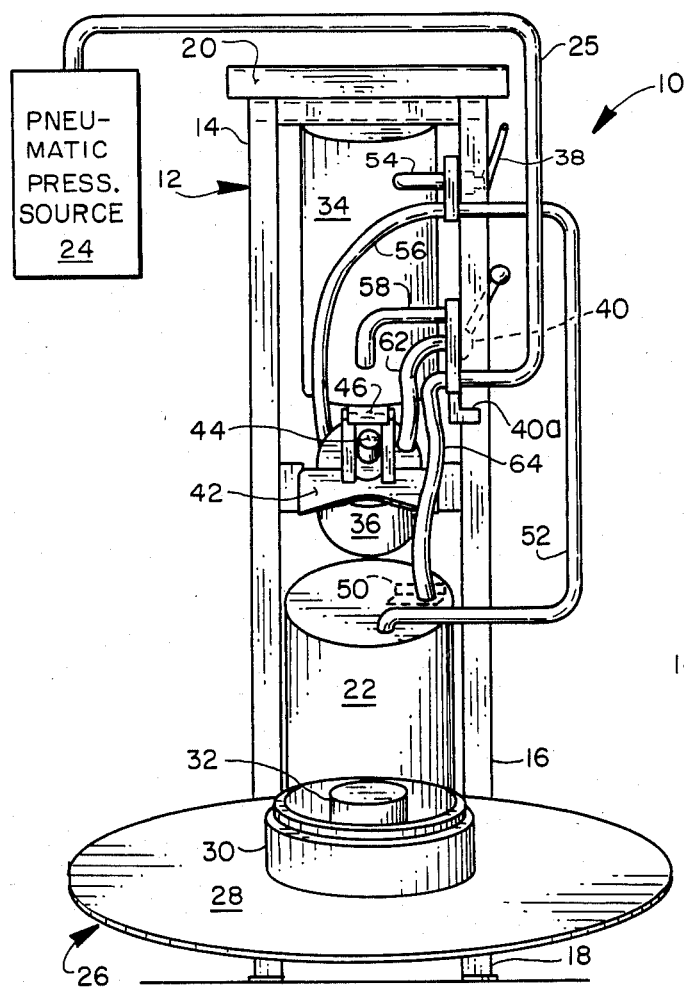
FIG. 1 is a front view of a tire bead separator in accordance with the present invention.
Figure 2:
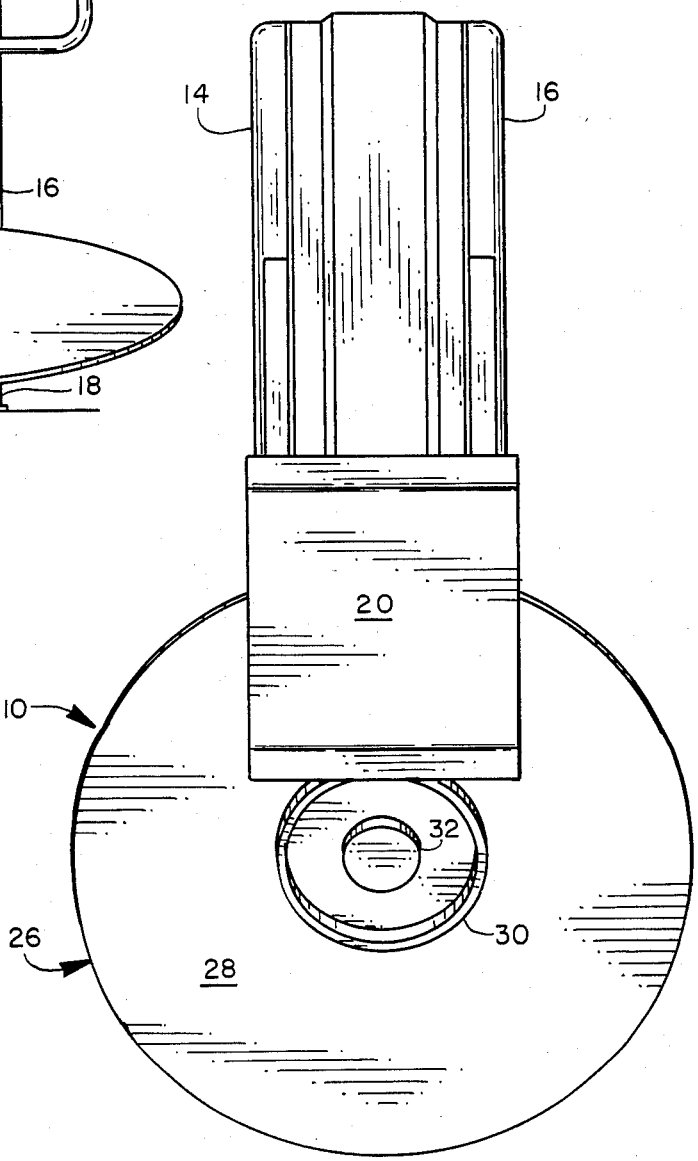
FIG. 2 is a top plan view of the tire bead separator of FIG. 1 wherein the various pneumatic and hydraulic control components have been omitted for simplicity.
Figure 3:
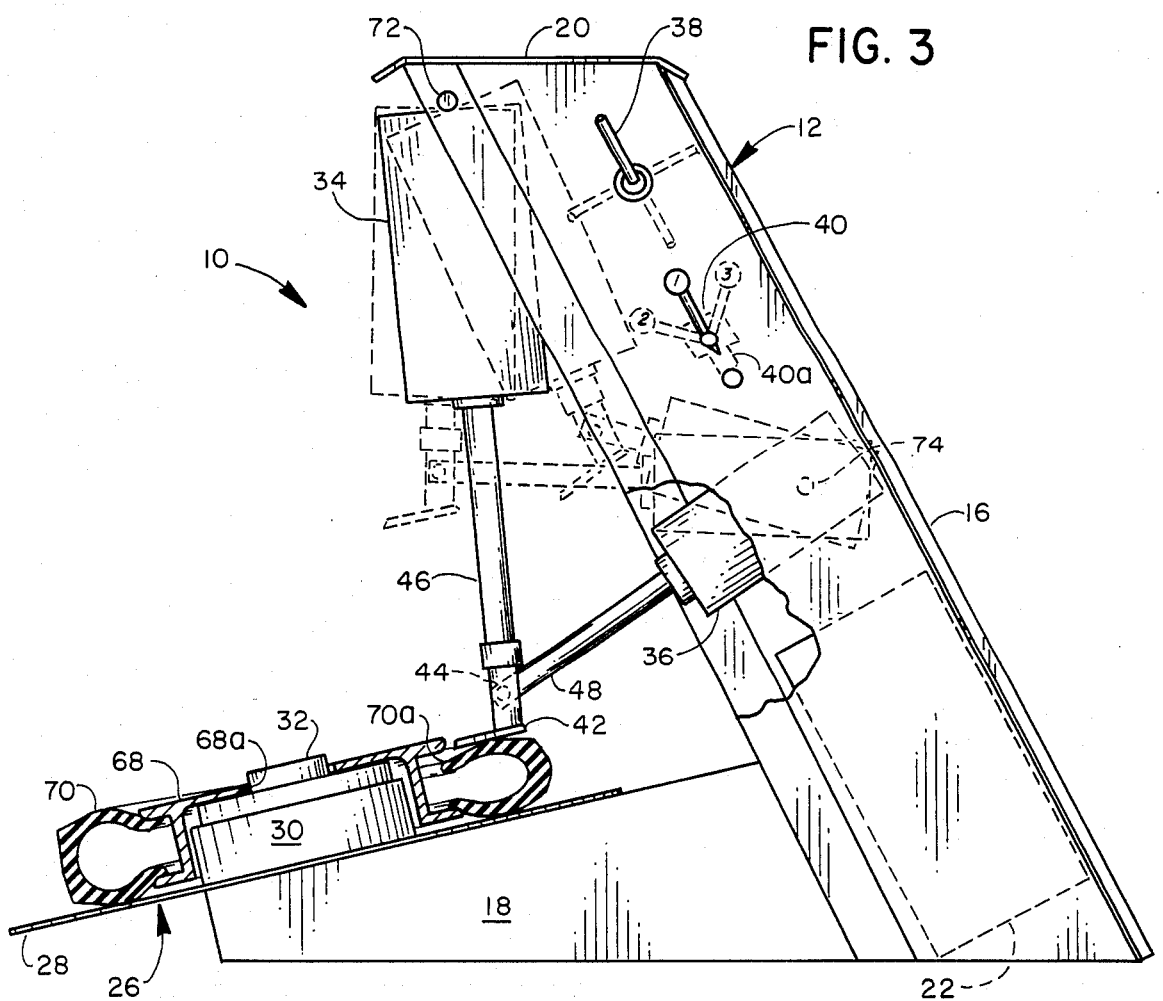
FIG. 3 is a lateral view of the tire bead separator of FIG. 1 shown partially in phantom wherein various components of the pneumatic hydraulic control system have been omitted for simplicity.

Referring to FIGS. 1, 2 and 3, there are respectively shown front, top plan, and lateral views of a tire bead separator 10 in accordance with the present invention. The front view of FIG. 1 of the tire bead separator 10 illustrates various components and elements of the hydraulic/pneumatic control system used in a preferred embodiment, while these elements of the tire bead separator have been omitted from FIGS. 2 and 3 for simplicity.

The tire bead separator 10 includes an upright support frame 12 comprised of first and second generally upright, inclined members 14 and 16, a base 18 coupled to the lower end portions of the first and second upright members, and a cross member 20 coupled between the upper end portions of the first and second upright members. The first and second upright members 14, 16 are inclined relative to the vertical as shown in FIG. 3 to increase the stability of the tire bead separator 10 by lowering its center of gravity and to provide a compact configuration for the tire bead separator 10.

Positioned upon the base in an inclined orientation is a rotatable table 26. The rotatable table 26 includes a generally circular, flat tire support disc 28, a wheel mounting ring 30, and a wheel alignment insert 32. The wheel alignment insert 32 is adapted for insertion in the center aperture 68a of a wheel 68. The wheel mounting ring 30 is adapted for insertion within the concave portion of the wheel 68 for securely maintaining the wheel 68 in position upon the rotatable table 26. With the wheel 68 engaged by the wheel mounting ring 30 and alignment insert 32, a tire 70 mounted on the wheel is positioned in contact with and is supported by the tire support disc 28. The tire support disc 28 is rotationally mounted to the base 18 and is provided with an inclined orientation, having a low portion which extends beyond the base and an upraised portion positioned adjacent to a center, inner portion of the base. In operating the tire bead separator 10, as described in detail below, the upper portion of the bead 70a of the tire 70 would first be separated from that portion of the wheel 68 with which it is in contact. The tire and wheel combination would then be rotationally displaced and another portion of the tire bead 70a would be separated from the wheel 68 until the entire tire bead was separated from the wheel rim, whereupon the tire could then be removed from the wheel in a conventional manner. The lower edge of the tire support disc 28 is closely spaced relative to the support surface of the tire bead separator 10 such as the floor (not shown) to facilitate positioning of the wheel 68 upon the tire bead separator 10 as well as facilitating its removal therefrom. This orientation of the tire support disc 28 also facilitates rotational displacement of the wheel and tire combination by an operator as the tire bead 70a is separated from the wheel 68. In rotating the combination of the tire 70 and wheel 68 disposed on the tire support disc 28, an operator who operates the machine while standing beside it would typically position one of his feet in contact with the tire with an arcuate movement of the foot providing rotational displacement of the tire, the wheel, and the tire support disc. As shown in the various figures, the wheel alignment insert 32 is concentrically positioned within the wheel mounting ring 30, while the wheel mounting ring is concentrically positioned upon the tire support disc 28.

Positioned between the first and second upright members 14, 16 and attached thereto is a cylindrical hydraulic reservoir 22 containing a noncompressible hydraulic fluid such as oil. Also positioned between the first and second upright members 14, 16 and coupled thereto by means of an upper pivot pin 72 is an upper cylinder 34. Also positioned between the first and second upright members 14, 16 and coupled to respective intermediate portions thereof by means of a lower pivot pin 74 is a lower cylinder 36. Extending from the lower end of the upper cylinder 34 is a first movable piston rod 46, while extending from the lower cylinder 36 is a second movable piston rod 48. The distal ends of the first and second piston rods 46, 48 are connected by means of a pivot coupling 44, such as a pin inserted through each of the piston rods, in a manner which allows for their relative rotational displacement. Securely mounted on the distal end of the first piston rod 46 is a fixed shoe element 42 which is adapted for positioning immediately adjacent to the rim portion of the wheel 68 and for engaging and displacing the immediately adjacent positoned portion of the bead 70a of the tire 70 as shown in FIG. 3. Also positioned on the second upright member 16 is an upper hydraulic transfer valve 38 and a lower air charging valve 40. The hydraulic transfer valve 38 and air charging valve 40 allow an operator while standing beside the apparatus to precisely control the position of the shoe element 42 in separating the tire's bead 70a from the wheel 68.

A pneumatic pressure source 24 is coupled by means of a pneumatic line 25 to the air charging valve 40. The air charging valve 40 is also coupled to an upper portion of the hydraulic reservoir 22 by means of a pneumatic line 64. A generally L-shaped baffle element 50 is mounted to an inner surface of the hydraulic reservoir 22 immediately adjacent to where it is coupled to the pneumatic line 64 to deflect air introduced into the hydraulic reservoir and reduce the possibility of this air becoming mixed with the hydraulic fluid within the reservoir. The air charging valve 40 is also coupled to respective rod end portions of the lower cylinder 36 and upper cylinder 34 by pneumatic lines 62 and 58. The hydraulic transfer valve 38 is coupled to respective butt end portions of the upper cylinder 34 and the lower cylinder 36 by hydraulic lines 54 and 56. Finally, the hydraulic transfer valve 38 is coupled to the hydraulic reservoir 22 via a hydraulic line 52.

During operation, the operator is positioned beside the tire bead separator 10 while performing the operation of breaking the tire bead. When thus positioned, the hydraulic transfer valve 38 and the air charging valve 40 are conveniently located for manual operation by the operator. The inclined orientation of the rotatable table 26 facilitates rotation of the table as well as a wheel and tire thereon by a slight foot movement of the operator. Downward displacement of the operator's foot under the influence of gravity while in contact with the rotatable table 26, facilitates rotational displacement of the tire 70 and the breaking of its bead 70a around the circumference thereof. The operator thus rolls the tire and wheel combination over to the tire bead separator 10, drops it onto the circular rotatable table 26, with the wheel 68 and tire 70 readily conforming to the circular profile of the rotatable table. The operator then manipulates the hydraulic transfer valve 38 and the air charging valve 40 as described in the following paragraphs to position the shoe element 42 for breaking the tire bead.

Although the operation of the tire bead separator 10 will now be described in terms of a combined pneumatic and hydraulic control system, the present invention is not limited to such a control system but will work equally well with an entirely hydraulic control system. By using an inert gas such as air under pressure in combination with a conventional fluid such as oil, the hydraulic medium functions as a metering and restraining means in compensating for the volatility and large impulse behavior characteristics of a compressed gas (air). By thus allowing the hydraulic system to dampen out the displacement in the pressurized pneumatic system, the possibility of injury to the operator or a bystander or of damage to the wheel by the rapid, accelerated movements associated with a pneumatic system under pressure is substantially eliminated. A pneumatic system is used to actuate a preferred embodiment of the tire bead separator 10 of the present invention primarily because it is economical as well as readily available in locations where tire changing and repair are typically carried out.

In one embodiment of the present invention, the hydraulic transfer valve 38 is a four position valve which could be in the form of a conventional three channel Y- or T-hydraulic valve. Similarly, the air charging valve 40 in one embodiment is a disc valve having three inlets and three branches within a rotationally displaceable disc element. The present invention is not limited to the use of these specific types of hydraulic and air valves, and in fact could employ a single manifold-type valve arrangement provided with a sufficient number of outlets, inlets, and control elements. Therefore, because the hydraulic transfer valve 36 and air charging valve 40 contemplated for use in the tire bead separator 10 of the present invention may be conventional in design and operation, these elements are shown in simplified form in the figures and their specific configuration is not described further herein.

Referring to FIGS. 4a through 4d, there is shown the sequence of operations under the control of an operator in separating a tire bead using the tire bead separator 10 of the present invention. The sequence of operations of the tire bead separator 10 begins with the hydraulic transfer valve 38 and the air charging valve 40 in positions 1 as shown in FIG. 4a. With the hydraulic transfer and air charging valves 38, 40 both in position 1, all pneumatic and hydraulic circuitry is closed and the tire bead separator 10 is inoperative. In addition, the respective piston rods 46, 48 of the upper cylinder 34 and the lower cylinder 36 are in the retracted positions.

In FIG. 4b, the air charging valve 40 has been moved to position 2, whereupon the hydraulic reservoir 22 is charged with compressed air delivered thereto from the air charging valve via pneumatic line 64. With the hydraulic reservoir 22 thus pressurized, movement of the hydraulic transfer valve 38 to position 2 will cause hydraulic fluid to flow via hydraulic line 52 to the hydraulic transfer valve and thence into the butt end of the lower cylinder 36 via hydraulic line 56. When hydraulic fluid flows into the butt end of the lower cylinder 36, its piston rod 48 is displaced to the extended position as shown in FIG. 4b. Extension of the second piston rod 48 from the lower cylinder 36 may be stopped by moving the hydraulic transfer valve 38 back to position 1 to provide precise control over the horizontal position of the shoe element 42.

With the air charging valve remaining in position 2, the hydraulic transfer valve 38 is then moved to position 3 as shown in FIG. 4c causing hydraulic fluid, under pressure, to flow via the hydraulic transfer valve into the butt end of the upper cylinder 34 via hydraulic line 54. The flow of hydraulic fluid via hydraulic line 54 to the butt end of the upper cylinder 34 will cause its piston rod 46 to extend in lowering the shoe element 42. Again, the downward displacement of the shoe element 42 may be stopped by returning the hydraulic transfer valve 38 to position 1. The shoe element 42 is thus initially horizontally displaced and then vertically displaced to a position where it engages the bead 70a of the tire 70 positioned upon the tire support disc 28. Continued downward displacement of the shoe element 42 in response to further extension of the first piston rod 46 from the upper cylinder 34 will result in separation of the tire bead 70a from the rim of the wheel 68.

After the tire bead 70a, or at least a portion thereof, has been separated from the wheel 68, the air charging valve 40 is moved to position 3 as shown in FIG. 4d in order to remove the pressure from the hydraulic reservoir 22. When the air charging valve 40 is moved to position 3, the gas under pressure escapes from the upper portion of the hydraulic reservoir 22 via pneumatic line 64 and is vented through the exhaust port 40a of air charging valve 40 to the atmosphere. In addition, with air charging valve 40 in position 3, gas under pressure is provided to the shaft or rod ends of the upper and lower cylinders 34 and 36 via pneumatic lines 58 and 62, respectively. With the rod ends of both the upper and lower cylinders 34, 36 under pneumatic pressure, the hydraulic transfer valve 38 is moved to position 4 as shown in FIG. 4d, to permit hydraulic fluid to escape from both cylinders and return to the uncharged hydraulic reservoir 22. Hydraulic fluid flows from the respective butt ends of the upper and lower cylinders 34, 36 via hydraulic lines 54 and 56 to the hydraulic valve 38 and thence to the hydraulic reservoir 22 via line 52. With the rod ends of each of the upper and lower cylinders 34, 36 under pneumatic pressure and the hydraulic fluid in their respective butt ends allowed to flow therefrom, the first and second piston rods 46, 48 are retracted and the shoe element 42 assumes its initial position at the start of the operating sequence as shown in FIG. 4a.

It should be noted that with the hydraulic transfer valve 38 in position 4 and the air charging valve 40 in position 2, hydraulic pressure will be delivered to the butt ends of the upper and lower cylinders 34, 36 initiating simultaneous extension of the first and second piston rods 46 and 48. Therefore, as the first and second piston rods 46, 48 are respectively extended from the upper and lower cylinders 34, 36, each of the piston rods can individually and selectively be retracted with the air charging valve 40 in position 3 and the hydraulic transfer valve 38 moved to position 2 so as to retract the second piston rod within the lower cylinder or by moving the hydraulic transfer valve to position 3 in order to retract the first piston rod 46 within the upper cylinder 34.

To summarize, the air charging valve 40 serves to either transfer pneumatic pressure to the hydraulic reservoir 22 when in position 2 or to the rod end of the upper cylinder 34 and/or the rod end of the lower cylinder 36, depending upon the position of the hydraulic transfer valve 38, when in position 3. Position 1 for both the hydraulic transfer valve 38 and the air charging valve 40 is a neutral position wherein the current status and operation of the tire bead separator 10 is maintained. The hydraulic transfer valve 38 directs hydraulic fluid to or from either the upper cylinder 34 or the lower cylinder 36 or to both of these cylinders simultaneously. With the air charging valve 40 in position 2, hydraulic fluid may be provided under pressure to the upper and lower cylinders 34, 36. With the air charging valve 40 in position 3, hydraulic fluid is permitted to flow from the upper and lower cylinders 34, 36. In any case, when the hydaulic transfer valve is in position 1, all movement will be terminated.

There has thus been shown a tire bead separator for breaking a tire bead. The tire bead separator includes an inclined rotatable support table for the tire and wheel combination which eliminates a "dead lift" situation encountered when the tire and wheel are oriented horizontally. The inclined support table facilitates the positioning of the tire and wheel combination upon and its removal from the tire bead separator. After breaking the tire bead, the tire and wheel combination may be easily lifted to an upright position to complete removal of the tire from the wheel using either a conventional pry bar or a special hand tool designed for that purpose with the most difficult procedure having been performed by the tire bead separator of the present invention. The tire bead separator includes a shoe element adapted to engage and displace the tire's bead. The shoe element is directly coupled to and controlled by a pair of cylinders driven by a pneumatically actuated, hydraulically damped control system. The tire bead separator is constructed with a low center of gravity and a sufficient mass that it does not "walk" due to the reciprocating action of the cylinders which takes place during normal operation. The apparatus is thus portable and does not have to be anchored to the floor. The pneumatically actuated control system in combination with the closed hydraulic system allows the tire bead separator to be operated anywhere where there is a compressed air source.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for separating a tire bead from a wheel upon which the tire is mounted, said apparatus comprising:

a portable frame including an inclined base attached thereto;

hydraulic control means mounted to said portable frame and coupled to a tire bead engaging shoe element for displacing said engaging element between a first retracted position and an extended position for contacting and displacing the tire bead from the wheel, said hydraulic control means including a first cylinder coupled to an upper portion of said portable frame and oriented vertically and a second cylinder coupled to an intermediate portion of said portable frame and oriented horizontally, each of said first and second cylinders having a respective extendible piston rod directly coupled to said engaging shoe element to permit the separation of a tire bead from wheels having a full range of widths without requiring repositioning of said engaging element relative to said control means, wherein said hydraulic control means is pneumatically actuated and includes a pneumatic pressure system with a manually operated hydraulic transfer valve and a closed hydraulic system with a reservoir and a manually operated pneumatic charging valve; and a rotatable support table mounted to said inclined base in an inclined orientation and adapted to receive the tire mounted on the wheel and to provide support therefor in an inclined orientation, wherein said support table includes a low portion and an upraised portion, with said upraised portion disposed vertically below said first cylinder and said low portion positioned in closely spaced relation to a support surface upon which the apparatus is disposed such that the tire and wheel may be positioned upon said support table without lifting the tire and wheel off of the support surface, said rotatable support table further including a wheel alignment insert adapted for insertion in an aperture in the wheel and a wheel mounting ring adapted for insertion within and engagement with a concave portion of the wheel and for maintaining the tire and wheel on said support table during separation of the tire bead from the wheel upon which the tire is mounted, and the extendible piston rod of said first cylinder being extendible in a substantially vertical direction directly above said rotatable support table and said tire, and the extendible piston rod of said second cylinder being extendible in a substantially horizontal direction above and laterally disposed from said rotatable support table and said tire.

2. The apparatus of claim 1 further including first and second pivoting coupling means for respectively coupling said first and second cylinders to said frame.

3. The apparatus of claim 1 further including pivoting coupling means for coupling said first and second cylinders together.

4. The apparatus of claim 1 wherein said hydraulic transfer valve is a 4-position valve and said pneumatic charging valve is a 3-position valve.

* * * * *